United States Patent
Cohen et al.

(10) Patent No.: US 10,110,542 B2
(45) Date of Patent: Oct. 23, 2018

(54) WEARABLE COMPUTING—AUGMENTED REALITY AND PRESENTATION OF SOCIAL INFORMATION

(71) Applicant: Microsoft Technology Licensing, LLC, Redmond, WA (US)

(72) Inventors: Tomer Cohen, Palo Alto, CA (US); Jonathan Redfern, Truckee, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 14/145,682

(22) Filed: Dec. 31, 2013

(65) Prior Publication Data

US 2015/0189026 A1 Jul. 2, 2015

(51) Int. Cl.
| | |
|---|---|
| *G06F 15/16* | (2006.01) |
| *H04L 12/58* | (2006.01) |
| *H04W 4/21* | (2018.01) |
| *H04W 4/02* | (2018.01) |
| *H04L 29/06* | (2006.01) |

(52) U.S. Cl.
CPC .............. *H04L 51/32* (2013.01); *H04L 51/20* (2013.01); *H04L 67/38* (2013.01); *H04W 4/02* (2013.01); *H04W 4/21* (2018.02)

(58) Field of Classification Search
CPC .................................................... G06Q 50/01
See application file for complete search history.

(56) References Cited

U.S. PATENT DOCUMENTS

| | | | | |
|---|---|---|---|---|
| 2011/0225069 | A1* | 9/2011 | Cramer ................. | G06Q 30/06 705/27.1 |
| 2012/0105475 | A1* | 5/2012 | Tseng ................. | G01C 21/3611 345/633 |
| 2014/0063058 | A1* | 3/2014 | Fialho ................. | G06T 11/60 345/633 |
| 2014/0108530 | A1* | 4/2014 | Papakipos ............. | G06Q 30/08 709/204 |
| 2014/0149888 | A1* | 5/2014 | Morris ................. | G06F 15/16 715/753 |
| 2014/0368538 | A1* | 12/2014 | Ratcliff ................. | G06Q 50/10 345/633 |

* cited by examiner

*Primary Examiner* — Sm Rahman
*Assistant Examiner* — Dae Kim
(74) *Attorney, Agent, or Firm* — Schwegman Lundberg & Woessner, P.A.

(57) ABSTRACT

A method of presenting on a device of a user of a social-networking system information about other users of the social-networking system is disclosed. A location of the user of a social-networking system is determined. Locations of the additional users of the social-networking system are determined. A subset of the additional users of the social networking system is selected based on the location of the user and the locations of the additional users and based on information stored in a profile of the user in comparison to information stored in profiles of the additional users. Instructions are transmitted to a device of a user, the instructions instructing the device to display in a condensed visual form the subset of the information stored in the profiles of the additional users.

19 Claims, 8 Drawing Sheets

WEARABLE COMPUTING—AUGMENTED REALITY AND PRESENTATION OF SOCIAL INFORMATION

TECHNICAL FIELD

This application relates generally to the technical field of online social networking, and, in one specific example, to augmenting a view of a location of a user of a social networking system with information pertaining to other users of the social networking system who are near to the location.

BACKGROUND

Various wearable mobile devices, such as head-worn devices (e.g., Google Glass) or smart watches (e.g., a Pebble smartwatch), may have displays that have various limitations, such as a smaller screen size or resolution, in comparison to other mobile devices of the user, such as a smart phone (e.g., an iPhone), a tablet (e.g., an iPad), or a notebook computer. However, because the user may more conveniently access these wearable mobile devices, the user may wish to use them to perform as many computing tasks as possible, despite their limitations. For example, a user of a social networking system, such as LinkedIn or Facebook, may wish to use a wearable computing device to access information pertaining to other users of the social networking system or to declare or acknowledge relationships with the other users of the social networking system. It may be difficult for the user to access such information or functionality of a social networking system via a wearable computing device unless a special user interface is provided on the wearable computing device.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

In various embodiments, a method of presenting on a device of a user of a social-networking system information about other users of the social-networking system is disclosed. A location of the user of a social-networking system is determined. Locations of the additional users of the social-networking system are determined. A subset of the additional users of the social networking system is selected based on the location of the user and the locations of the additional users and based on information stored in a profile of the user in comparison to information stored in profiles of the additional users. Instructions are transmitted to a device of a user, the instructions instructing the device to display in a condensed visual form the subset of the information stored in the profiles of the additional users.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
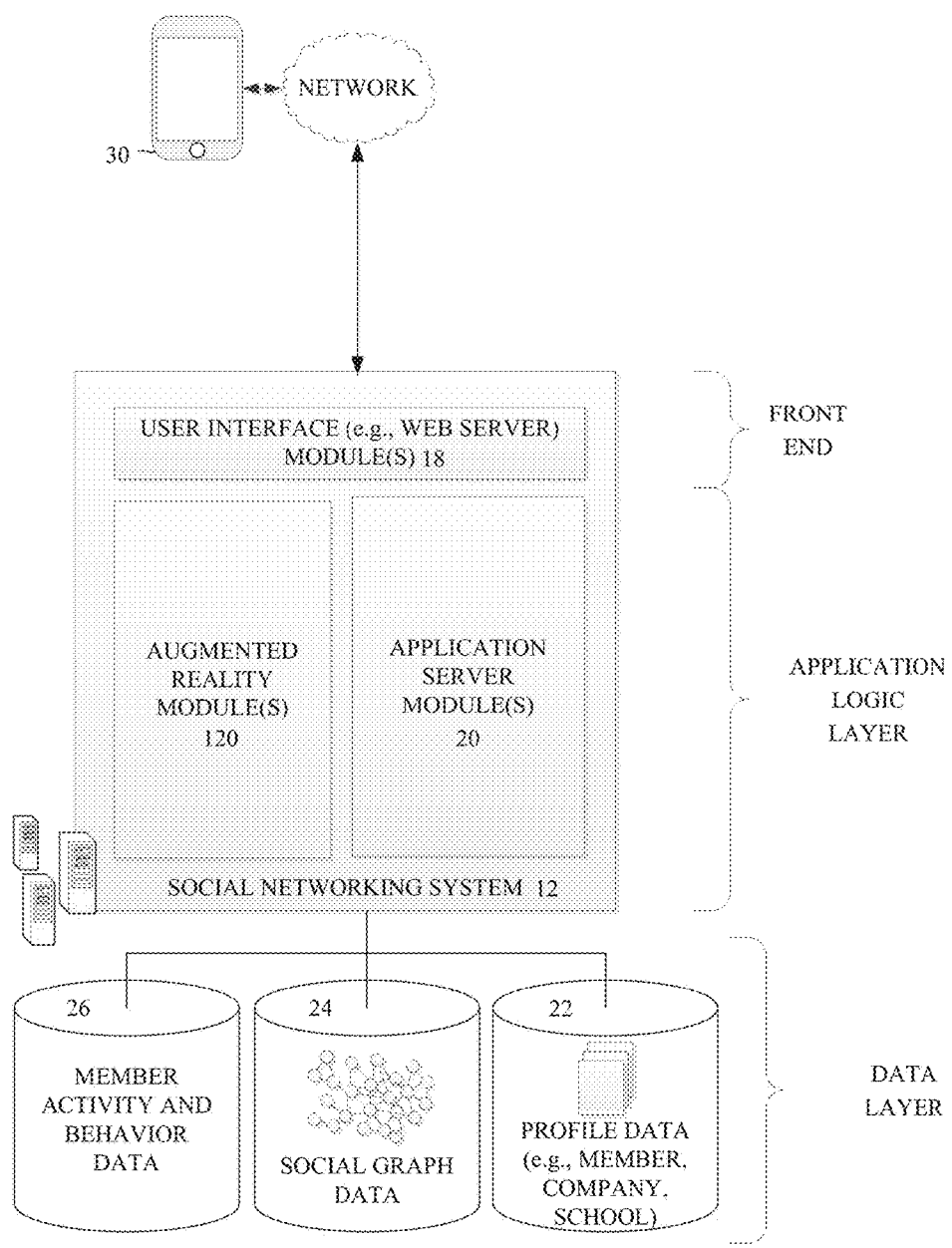
FIG. 1 is a network diagram depicting a client-server system within which various example embodiments may be deployed.

FIG. 1 is a network diagram depicting a server system (e.g., social networking system 12) that includes augmented reality module(s) 120 for responding to requests or commands received from a mobile computing device 30, consistent with some embodiments of the present invention. As described in greater detail below, the augmented reality module(s) 120 may be configured to receive commands or requests from mobile computing devices, such as that with reference number 30 in FIG. 1, process or analyze the commands or requests, and transmit responses to the commands or requests. In various embodiments, the received commands or requests may include various information, such as a member identifier uniquely identifying a member of the social networking service (e.g., corresponding to a user of the mobile computing device 30), location information identifying a member's current location, and so on.

As shown in FIG. 1, the social networking system 12 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module (e.g., a web server) 18, which receives requests from various client-computing devices including one or more mobile computing devices 30, and communicates appropriate responses to the requesting client computing devices. For example, the user interface module(s) 18 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile computing devices and mobile-specific operating systems.

As shown in FIG. 1, the data layer includes several databases, including a database 22 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 22.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 12, information relating to the member's activity and behavior may be stored in a database, such as the database with reference number 26.

The social networking system 12 may provide a broad range of other applications and services that allow members the opportunity to share and receive information, often customized to the interests of the member. For example, with some embodiments, the social networking system 12 may include a photo sharing application that allows members to upload and share photos with other members. With some embodiments, members of a social networking system 12 may be able to self-organize into groups, or interest groups, organized around a subject matter or topic of interest. With some embodiments, members may subscribe to or join groups affiliated with one or more companies. For instance, with some embodiments, members of the social networking service 12 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with the social graph data of the database with reference number 24.

The application logic layer includes various application server modules 20, which, in conjunction with the user interface module(s) 12, generates various user interfaces with data retrieved from various data sources or data services in the data layer. With some embodiments, individual application server modules 20 are used to implement the functionality associated with various applications, services and features of the social networking system. For instance, a messaging application, such as an email application, an instant messaging application, or some hybrid or variation of the two, may be implemented with one or more application server modules 20. A photo sharing application may be implemented with one or more application server modules 20. Similarly, a search engine enabling users to search for and browse member profiles may be implemented with one or more application server modules 20. Of course, other applications and services may be separately embodied in their own application server modules 20.

As illustrated in FIG. 1, social networking system 12 includes augmented reality module(s) 120, which are described in more detail below.

Figure 2A:
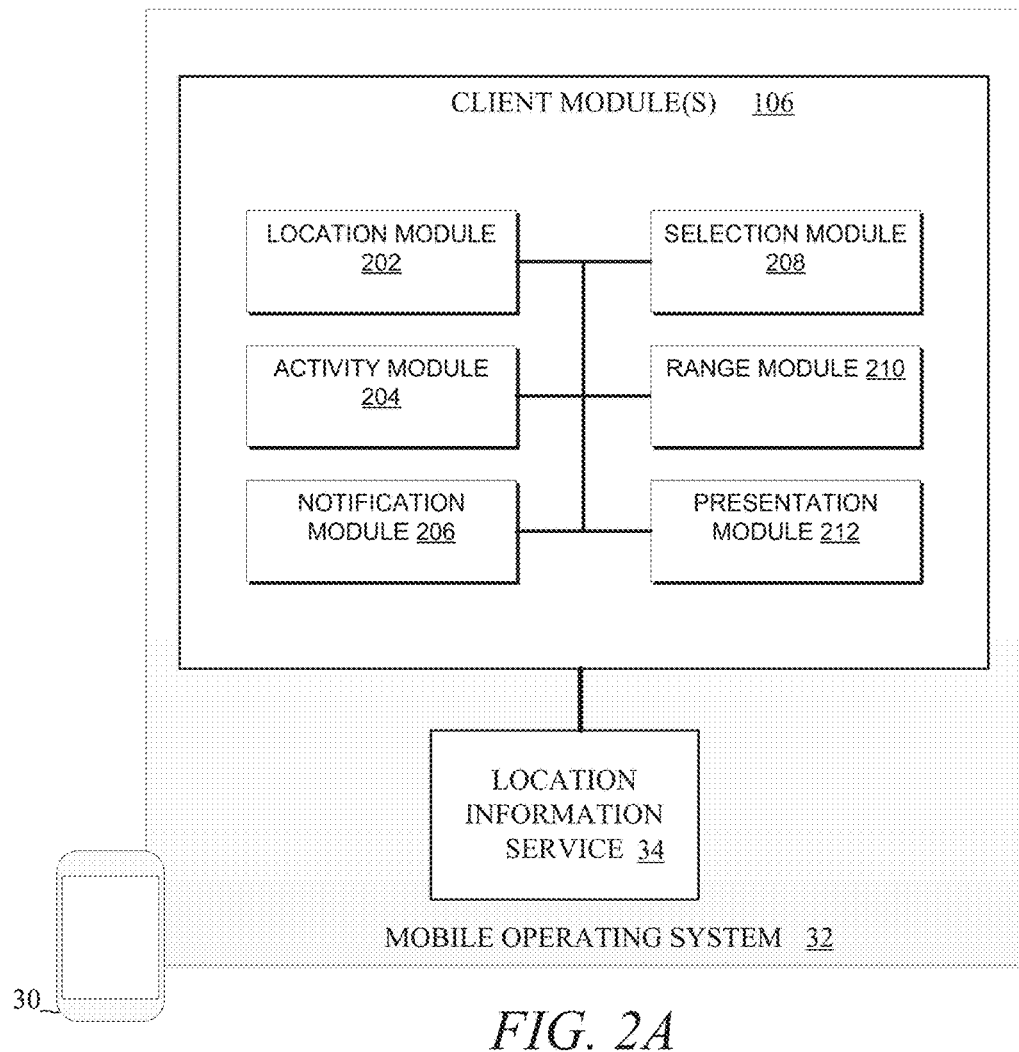
FIG. 2A is a block diagram depicting example client module(s) of a mobile computing device.

FIG. 2A is a block diagram depicting example client module(s) of a mobile computing device 30, consistent with some embodiments of the invention. As is understood by skilled artisans in the relevant computer- and mobile device-related arts, each module or engine shown in FIG. 2A represents a set of executable software instructions and the corresponding hardware (e.g., memory, processor, sensor devices) for executing the instructions, and deriving or generating relevant data. To avoid obscuring the inventive subject matter with unnecessary detail, various functional modules and engines that are not germane to conveying an understanding of the inventive subject matter have been omitted from FIG. 2A.

As illustrated in FIG. 2A, the mobile computing device 30 includes a mobile operating system 32, which includes a location information service (or, module) 34. The service 34 provides an application-programming interface (API) that allows the client module(s) 106 to invoke various functions, or access certain data, that are provided and/or derived by the respective services. For example, the location information service 34 may operate with one or more location sensing components or devices (e.g., a GPS component, WiFi® triangulation, iBeacons or other indoor positioning systems, and so forth) to derive location information representing the current location of the mobile computing device 30, as well as the current speed and direction of travel. The client module(s) 106, by making an API request to the location information service 34, can obtain this location information (e.g., current location, direction and speed of travel, etc.) of the mobile computing device. Accordingly, with some embodiments, the location information can be included with a content request communicated to a content server, thereby allowing the content server to select content items based at least in part on the current location of the user, or the current location and direction and speed of travel.

The client module(s) 106 include various modules 202-212. A location module 202 may be configured to detect locations of the client machines 110 (e.g., via communications with the location-based services application(s) 170 or GPS receivers of the client machines 110).

An activity module 204 may be configured to recognize a user's current activity (e.g., via an API, such as Google Play services), such as whether the user is currently in a vehicle, on a bicycle, on foot, standing still, tilting, or performing an unknown activity.

A notification module 206 may be configured to send notifications to external system(s) (e.g., the social-networking system 102 or the location-based services system 150) and receive notifications from the external system(s). For example, the notification module 206 may communicate information about the user's location or current activity to the social-networking system 102 or location-based services system 152. The notification module 206 may receive responses back from the external systems. For example, the social-networking system 102 may, based on information pertaining to the user's location or current activity, provide information pertaining to other users who are nearby to the user or are similar to the user (e.g., based on profiles of the users maintained with respect to the social-networking system 12). In various embodiments, the notifications may also include instructions for presenting information about selected users of the social networking system on a device of the user in a condensed visual form, as described in more detail below.

A selection module 208 may select a subset of the information received from the external systems for presentation to the user. The selecting may be based on limitations of the device (e.g., screen size or resolution), a type of the content, user preferences, and so on.

A range module 210 may be configured to identify people, objects, or other things that are within range of a user or device of the user. For example, the range module 210 may determine whether additional users are in a field of vision of a Google Glass being worn by the user. Or the range module 210 may determine whether additional users are in a direction towards which a device being worn by the user is oriented (e.g., whether the additional users are to the North based on the user pointing the device to the North).

A presentation module 212 may be configured to present notifications on a device of a user (e.g., via a user interface that is particularly adapted for the device of the user). The presentation may be based on the user's location or activity or notifications received from external systems. The presenting of the information may include generating a condensed visual form of the information. Thus, the information received presented in a form that is more suitable for a mobile device having presentation limitations (e.g., a small screen space), such as a wearable computing device (e.g., Google Glass or a smartwatch).

Figure 2B:
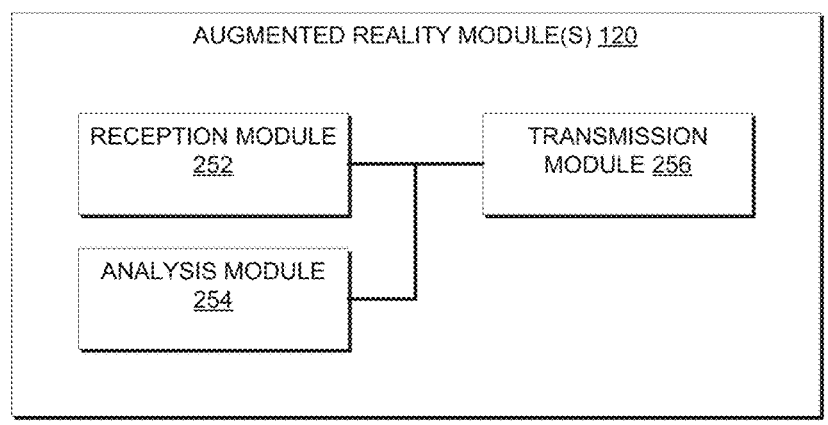
FIG. 2B is a block diagram illustrating example augmented reality module(s) 120.

FIG. 2B is a block diagram illustrating example augmented reality module(s) 120. A reception module 252 may be configured to receive notifications from the client machines 110. Such notifications may include information pertaining to an identity of a user of a client machine, the location of the client machine, an activity of the user of the client machine, a request by a user of a client machine (e.g., to access functionality of the social-networking application(s) 120), and so on.

An analysis module 254 may be configured to analyze the received notifications and determine proper responses. For example, based on receiving of notifications pertaining to the location or activity of the user or information pertaining to a type of the client machine or device currently being used by the user, the analysis module 254 may determine to generate a notification that includes information pertaining to other users of a social networking system who are nearby to the user or performing activities similar to the user.

In various embodiments, the analysis module 254 may select the information pertaining to the other users based on information known about the user, such as similarities between the user and the other users, declared or acknowledged relationships between the user and the other users, and so on. In various embodiments, the analysis module 254 may generate a notification based on the user having been within a certain proximity to another user for a predetermined length of time. For example, if Fred is within proximity to Joe for two seconds, the analysis module 254 may identify that it is likely that Joe and Fred did not interact. However, if Fred is within proximity to Joe for five minutes, the analysis module 254 may identify that it is likely that Joe and Fred did interact. The generation of the notification may include generating a request further information from the user about identified interactions between the user and other users, such as whether the user wishes to declare a relationship with the other users with respect to the social-networking system 102.

The transmission module 256 may be configured to transmit generated notifications to the client machines 110.

Although the functionality corresponding to modules 202-212 is depicted and described as being implemented on the client side (e.g., by the client module(s) 106), in various embodiments, some or all of the functionality corresponding to modules 202-212 may be implemented on the server side (e.g., by the augmented reality module(s) 120), and vice versa. Thus, in various embodiments, one or more algorithms implemented on the client side or server side may utilize information collected about the user on the client or server side, such as the member's current activity, current location, past behavior, social/graph data, profile data, and so on.

Figure 3:
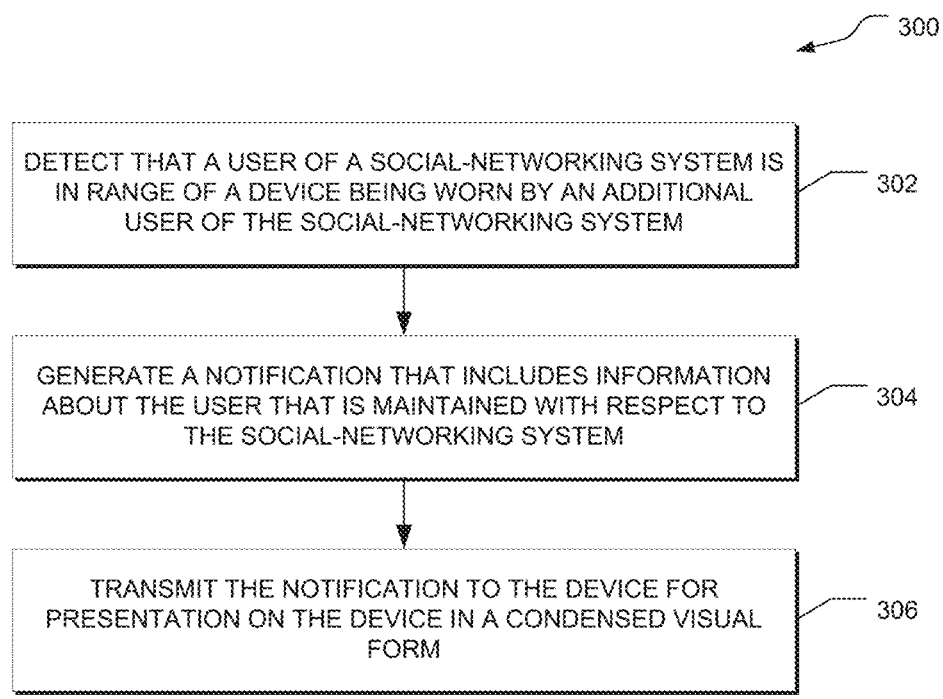
FIG. 3 is a flow chart illustrating example operations of a method of presenting information about a user of a social networking system in a condensed visual form on a device of an additional user of the social networking system.

FIG. 3 is a flow chart illustrating example operations of a method 300 of presenting information about a user of a social networking system in a condensed visual form on a device being worn by an additional user of the social networking system. In various embodiments, the method 300 may be implemented by one or more of the modules of FIG. 2.

At operation 302, the analysis module 254 may detect that a user of a social-networking system is in a detection range (e.g., within a field of vision) of a device being worn by an additional user of the social-networking system. This detection may be based, for example, on information received from the client machine(s) by the reception module 252. Such information may include information collected by the range module 210, such as an orientation of a device worn by the user, an image recorded by the device, and so on. The analysis module 210 may make the detection based on, for example, the device being oriented in the direction of an additional user, an image of the additional user being recorded by the device, or a received GPS location of the additional user falling within a range of detectability of the device. Or the analysis module 254 may make the detection based on input received from any sensor on the device that is communicated to the analysis module 254, input received from the location-based services system 152, or any combination of such inputs.

At operation 304, the analysis module 254 may generate a notification (e.g., via the reception module 252) that includes information about the additional user that is maintained with respect to the social-networking system. Such information may include information specified by the additional user or information about the additional user that is collected by or provided to the social-networking and stored in a profile of the additional user. Such information may include the information discussed with respect to FIG. 5-6 below.

At operation 306, the transmission module 206 may transmit the notification to the device for presentation on the device in a condensed visual form. For example, the information may be presented through augmented reality highlighting of the user as seen by the additional user through the device. Or the information may be presented as small graphical images presented on the device and visually associated with the user. FIG. 5 illustrates an example of a user interface in which the information about the user may be presented (e.g., via the presentation module 212) in the device in condensed form.

Figure 4:
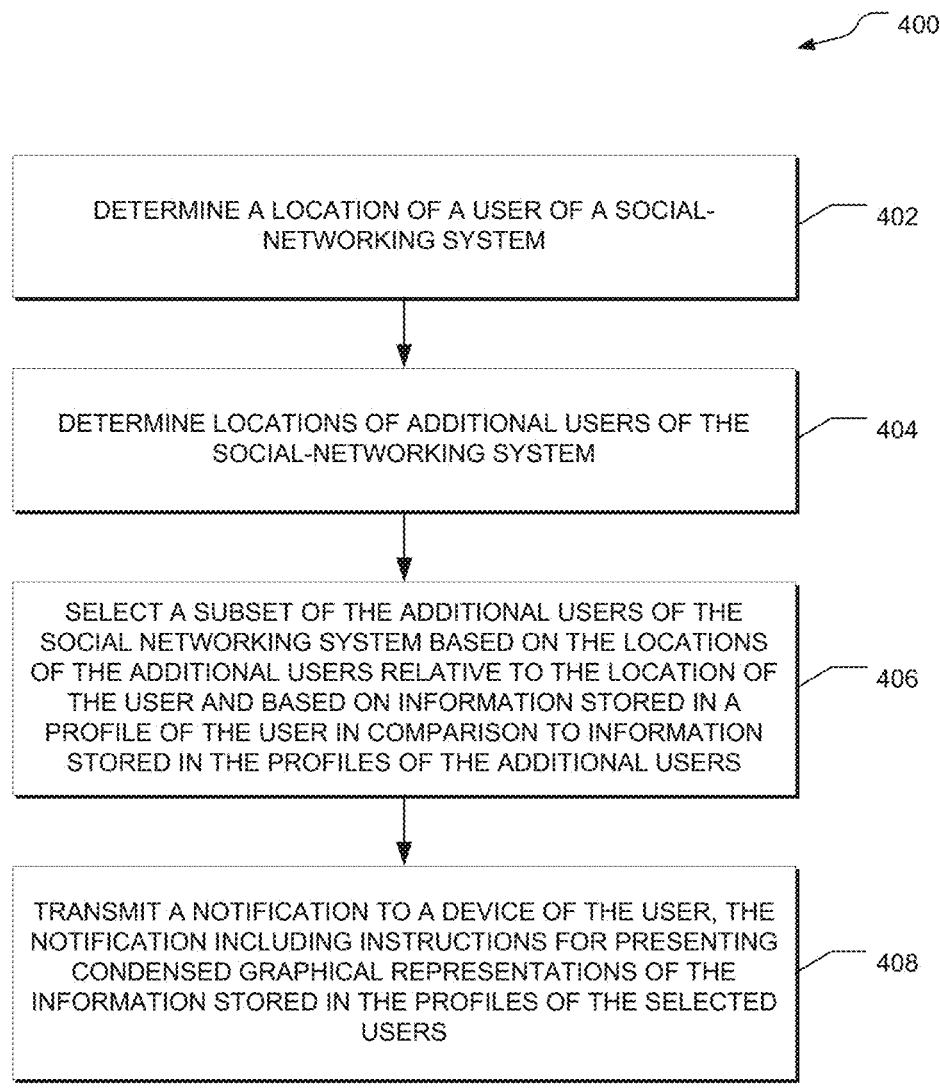
FIG. 4 is a flow chart illustrating example operations of a method of transmitting instructions to a device for presenting, on a device of a user of a social networking system, condensed graphical representations of information stored in profiles of selected additional users of the social networking system.

FIG. 4 is a flow chart illustrating example operations of a method of transmitting instructions to a device for presenting, on a device of a user of a social networking system, condensed graphical representations of information stored in profiles of selected additional users of the social networking system. In various embodiments, the method 400 may be implemented by one or more of the modules of FIG. 2.

At operation 402, the analysis module 254 detects a location of a user of a social-networking system. For example, the analysis module 254 may receive information (e.g., via the reception module 252) that pertains to a location of a user of a social-networking system. In various embodiments, the information is collected by the location module 202 and transmitted to the social-networking system 102 (e.g., via the notification module 206). Or the information is received from the location-based services applications 170. In various embodiments, the information includes GPS data that may identify a geographical location of the user.

At operation 404, the analysis module 254 detects locations of additional users of the social-networking system.

At operation 406, the analysis module 254 may select a subset of the additional users of the social networking system based on the locations of the additional users relative to the location of the user. In various embodiments, the analysis module 254 may further select the subset of the additional users based on information stored in a profile of the user in comparison to information stored in the profiles of the additional users, or both. For example, the analysis module 254 may select a subset of the additional users who are within a certain proximity to the user (e.g., within one mile) and have, via their profiles, declared or acknowledged relationship with the user (e.g., have acknowledged a business connection, friendship, or other relationship with the user). Thus, for example, the analysis module 254 may select business connections of the users that are within one mile of the current location of the user. Or the analysis module 254 may select the subset of the additional users based on similarities between information stored in the profiles of the additional user and information stored in the profile of the user, such as similarities between titles, employers, educational background, connections, activities, interests, affiliations, and so on. In various embodiments, the selection of the subset of the additional users may be done later by the selection module 208 (on the client side) instead of or in addition to the selection by the analysis module 254 (on the server side).

At operation 408, the transmission module 256 transmits a notification to the device of the user. The notification includes instructions for presenting condensed graphical representations of the information stored in profiles of the selected users on the device of the user. For example, the notification may include instructions for presenting a condensed graphical representation of the educational background of one of the selected users based on the user and the one of the selected users having a similar educational background. Or the notification may include instructions for presenting a condensed graphical representation of a current employer of one of the selected users based on a determination that the user was previously employed by the same employer. In various embodiments, each of the selected users is associated with different sets of graphical representations pertaining to profile information in their profiles that is most relevant to the user (e.g., as specified by the user via user preferences maintained with respect to the social-networking system). In various embodiments, the user may configure the notification module 204 to recognized particular fields of data stored in the profiles of the selected users that are most relevant for presentation to the user. FIG. 5B shows an example user interface that includes example condensed graphical elements that may be displayed on the device of the user.

Figure 5A:
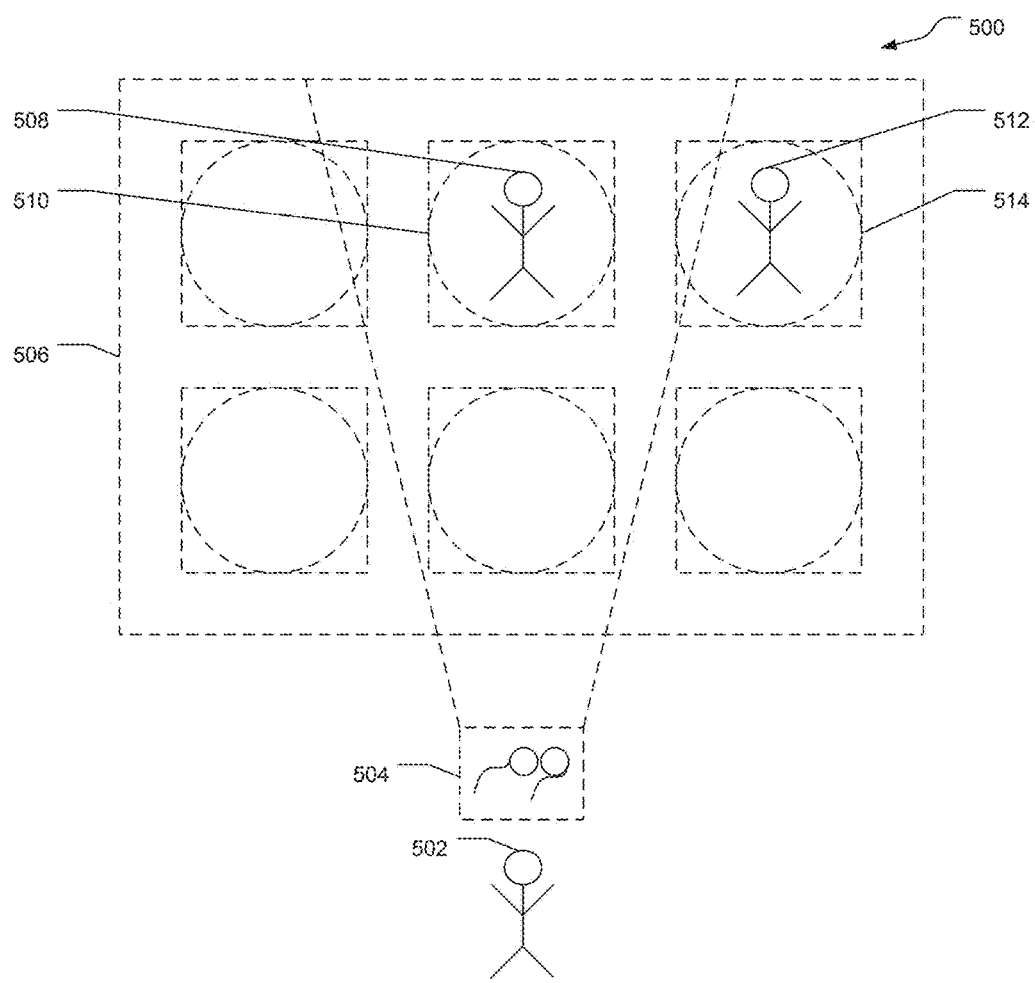
FIG. 5A is a block diagram illustrating an example field of vision of a wearable mobile device being worn by a user.
Figure 5B:
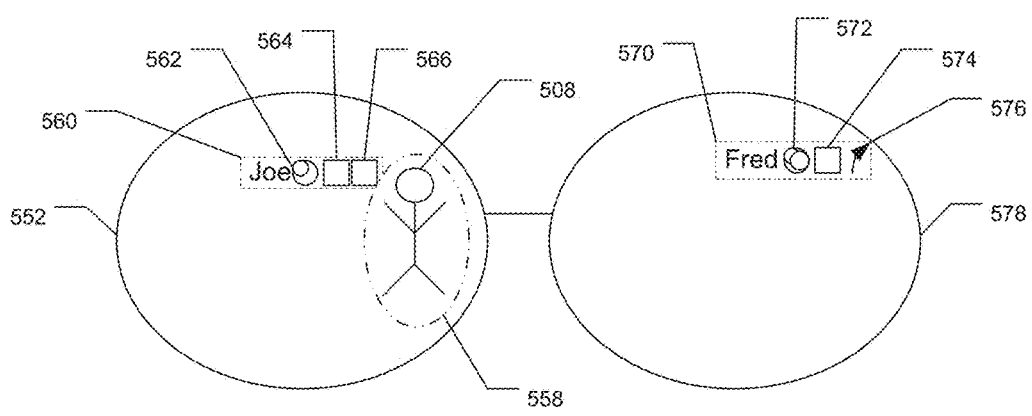
FIG. 5B is a block diagram illustrating an example user interface that may be presented on a wearable mobile device of a user.

FIG. 5A is a block diagram illustrating an example field of vision 500 of a wearable mobile device 504 of user 502. When looking through the wearable mobile device 504, the user 502 sees user 508 (e.g., "Joe"). That is, the user 508 is in range (e.g., in the field of vision) of the wearable mobile device 504 (e.g., based on the direction that the device or user is facing). However, the user 512 (e.g., "Fred") is not in the field of vision of the wearable mobile device 504. Furthermore, a virtual grid 506 shows the relative positions of users 502, 508, and 512. For example, user 508 is in grid square 510 and user 514 is in grid square 512. Grid square 514 is one grid square to the right (e.g., geographically east, depending on the direction the user is facing) of grid space 510. Furthermore, grid square 510 is one grid space forward (e.g., geographically north) of user 502 and grid square 514 is one grid space forward and one grid space to the right (e.g., geographically northeast) of the user 502. In various embodiments, the grid spaces 510 and 514 may correspond to geo-fences corresponding to the geographical location of the grid spaces.

FIG. 5B is a block diagram illustrating an example user interface 550 that may be presented on the wearable mobile device 504 being worn by the user 502. Here, the user 508 is in the field of vision of the user 502 and is seen by the user 502 when looking through the wearable mobile device 504. The user interface on the mobile device includes a highlighting 508 of the user. For example, the user interface may display a circle around the user 508. The highlighting 508 may convey information known about the user, such as information pertaining to the user that is maintained with respect to the social networking system. For example, the highlighting 508 may be of a particular format (e.g., shape, color, style, border thickness, and so on) that corresponds to a type or level of relationship that user 502 has declared or acknowledged with respect to the user 508. Thus, the user 502 may be able to determine from the format of the highlighting whether the user 508 is a friend, connection, or follower of the user 502, or vice versa.

In various embodiments, additional information about the user 508 may be presented in the user interface (e.g., in a left portion 552 of the wearable mobile device 504). The additional information may be presented based on a determination that the user 508 is in the field of vision of the wearable mobile device 504. For example, the user interface may include an information region 560. The information region 560 may include information known about the user 508. In various embodiments, the information may be presented in a condensed graphical form. For example, shortened text may be used (e.g., the first name of user 508, but not the last name of the user 510, or vice versa). Or abbreviations may be used. Or one or more graphical elements may be used. For example, a graphical element 562 may depict a level of relatedness between the user 502 and the user 508 (e.g., a circle embedded within another circle may represent that the user 502 and the user 508 have a second-degree connection). As another example, a graphical element 564 may indicate the current employer of user 508 (e.g., presented as a logo of the company). As another example, a graphical element 566 may indicate an educational background of the user 508 (e.g., a logo of a university from which the user 508 graduated).

In various embodiments, information about the user 512 may also be presented in the user interface (e.g., in a right portion 578 of the wearable mobile device 504). The information about the user 512 may be presented based on a determination that the user 512 is not in the field of vision of the wearable mobile device 504. For example, the user interface may include an information region 570. In various embodiments, the information region 574 may include one or more graphical elements. For example, the information region 570 may include an information element 574 that depicts a level of relatedness between the user 502 and the user 512 (e.g., three levels of embedded circles may indicate that the user 502 and the user 512 have a third-degree connection). For example, the information region 570 may include a graphical element 574 that represents information known about the user 512. Or the information region 570 may include a graphical element 576 that depicts a location of the user 512 relative to the location of the user 502 (e.g., an arrow pointing to up and to the right to may show the geographical position of the user 512 relative to the user 502).

In various embodiments, the user 502 or an administrator of the social networking system may configure the information regions 560 or 570 to include particular information known about the users inside the field of vision of the wearable mobile device 504 or outside the field of vision of the mobile device 504. Furthermore, the user 502 or the administrator may configure a mapping of information elements to types of information known about the users (e.g., via a user interface of the social networking system). Thus, the user 502 may not only be able to determine which graphical elements appear within the user interface of the wearable mobile device, but also define or determine the meanings of the graphical elements (e.g., by mapping particular graphical elements to particular values of data fields of user profiles maintained with respect to the social-networking system).

In various embodiments, the user interface may allow the user to interact with content displayed on the device. For example, the user may be able to provide an input to the device to generate and send a notification to the social-networking system 102. The notification may specify that the user wishes to declare or acknowledge a relationship the users 512 or 514, send a message to the users 512 or 514, or learn more about users 512 or 514 (e.g., receive more information from the networking system 102 about the users 512 or 514). In various embodiments, the device may automatically receive a notification from the social-networking 102 to prompt the user to perform one of these actions (e.g., prompt the user to acknowledge a relationship with another user) based on a determination that it is likely (e.g., based on distance or time parameters) that a user has interacted with the other user.

Figure 6:
FIG. 6 is a block diagram illustrating an example user interface for presenting information about (e.g., a profile) of a user of a social networking system.

FIG. 6 is a block diagram illustrating an example user interface 600 for presenting information about (e.g., a profile) of a user of a social networking system. In various embodiments, the user interface 600 may be more suitable for presenting on a mobile device of the user that is not a wearable mobile device, such as a device having a larger screen or resolution (e.g., an iPad, iPhone, or portable computer). However, various information presented in the user interface 600 may be adapted (e.g., via the presentation module 212) for presentation on a wearable mobile device of the user (e.g., in a more condensed or representative form, as described above.)

In various embodiments, the user interface 600 may include options for endorsing skills or expertise of a user of the social networking system. Additionally, the user interface 600 may include a summary of information known about the user, such as a photo of the user, the name of the user, a title of a job currently held by the user, a name of a current employer of the user, a geographical area in which the user lives or works, an industry in which the user works, one or more names of previously employers of the user, information about an educational of the user (e.g., the names of one or more schools that the user attended), and so on.

The user interface 600 may include information about activities of the user with respect to the social networking system, such as endorsing other users (e.g., with respect to particular skills or expertise), changing profile information (e.g., updating employer, job title, or any other information), making a posting (e.g., a current status), liking something (e.g., a news article, a posting by another user, and so on), or any other activity of the user.

The user interface 600 may include background information about the user, such as a summary of qualifications that is specified by the user or work experience of the user, including titles held, names of employers, dates of employment with each of the employers, job descriptions pertaining to positions held with employers, and so on.

The user interface 600 may include connection information about the user, such as names, photos, titles, and employers of other users whom have acknowledged having a connection with the user on the social networking system or other users that the user is following on the social networking system.

Although not depicted in FIG. 6, the user interface 600 may also include various other information, including a list of skills and expertise of the user, including information about other users who have vouched for the user's skills and expertise., education of the user, including degrees earned, schools attended, dates of attendance, awards received, activities and societies in which the user had a membership, and so on. The user interface 600 may also include information about user groups to which the user belongs, other users that the user is following, organizations to which the user belongs, interests of the user, or any other information that the user has provided to the social networking system or that the social networking system has determined about the user.

Any information that is known about the user, such as the information presented the user interface 600 may be presented in a condensed form on a wearable mobile device of the user, as described above with respect to FIG. 5.

Figure 7:
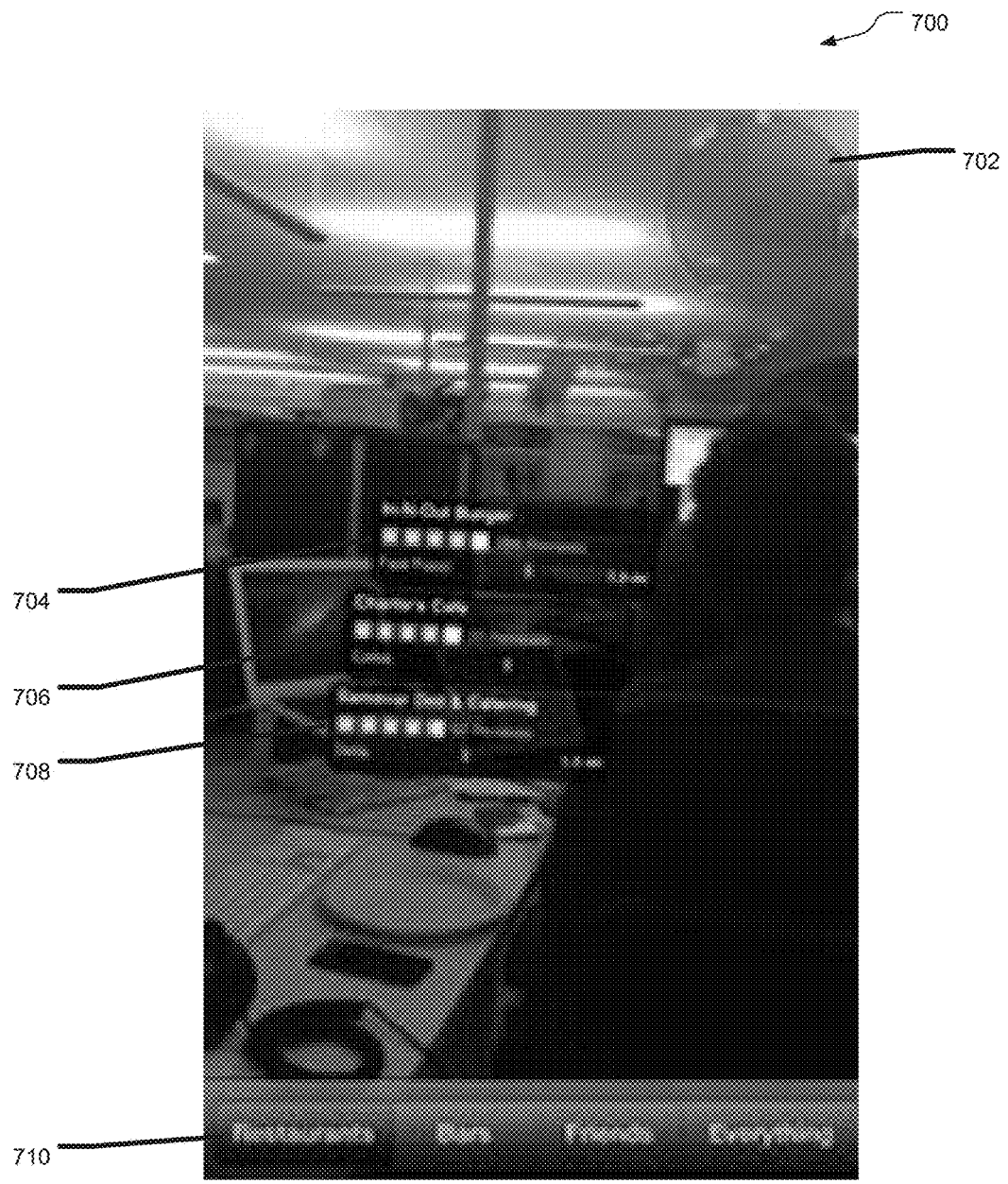
FIG. 7 is a screenshot of an example user interface of presenting information in a condensed visual form on a wearable device.

FIG. 7 is a screenshot of an example user interface in which information received from an external system is presented in a condensed visual form. In various embodiments, the condensed visual form of the information is suitable for presentation on a wearable device of a user. A "monocle" user interface element 702 is displayed on a lens of the device. The lens is being worn over an eye of the user. The white dots on the perimeter of the monocle represent locations of three restaurants in proximity to the current location of the user and in the direction in which the device is oriented. Information user interface elements 704, 706, and 708 are also displayed on the lens. The information user interface elements 704, 706, and 708 provide information pertaining to three restaurants, respectively, in a condensed form. The information includes the name of the restaurant, a rating of the restaurant, a number of reviews of the restaurant, a distance of the restaurant from the current user, a type of food served by the restaurant, and so on.

The information is displayed on the lens such that it is minimally distracting to the user. For example, the background of the monocle user interface element 702 is at least partially transparent and displayed in the upper right corner of the lens. Similarly, the background of each of the information user interface elements 704, 706, and 708 is transparent. The locations of each of the user interface elements 704, 706, and 708 are arranged such that they map or correspond to the locations of the three white dots shown on the perimeter of the monocle user interface element 702 (e.g., from top to bottom or from left to right). The menu user interface element 710 enables the user to filter content that is displayed in the user interface elements 702-708. Here, the user has selected "Restaurants." By selecting "Friends," the user may be presented with information pertaining to other users of the social networking system 102, as described above.

Figure 8:
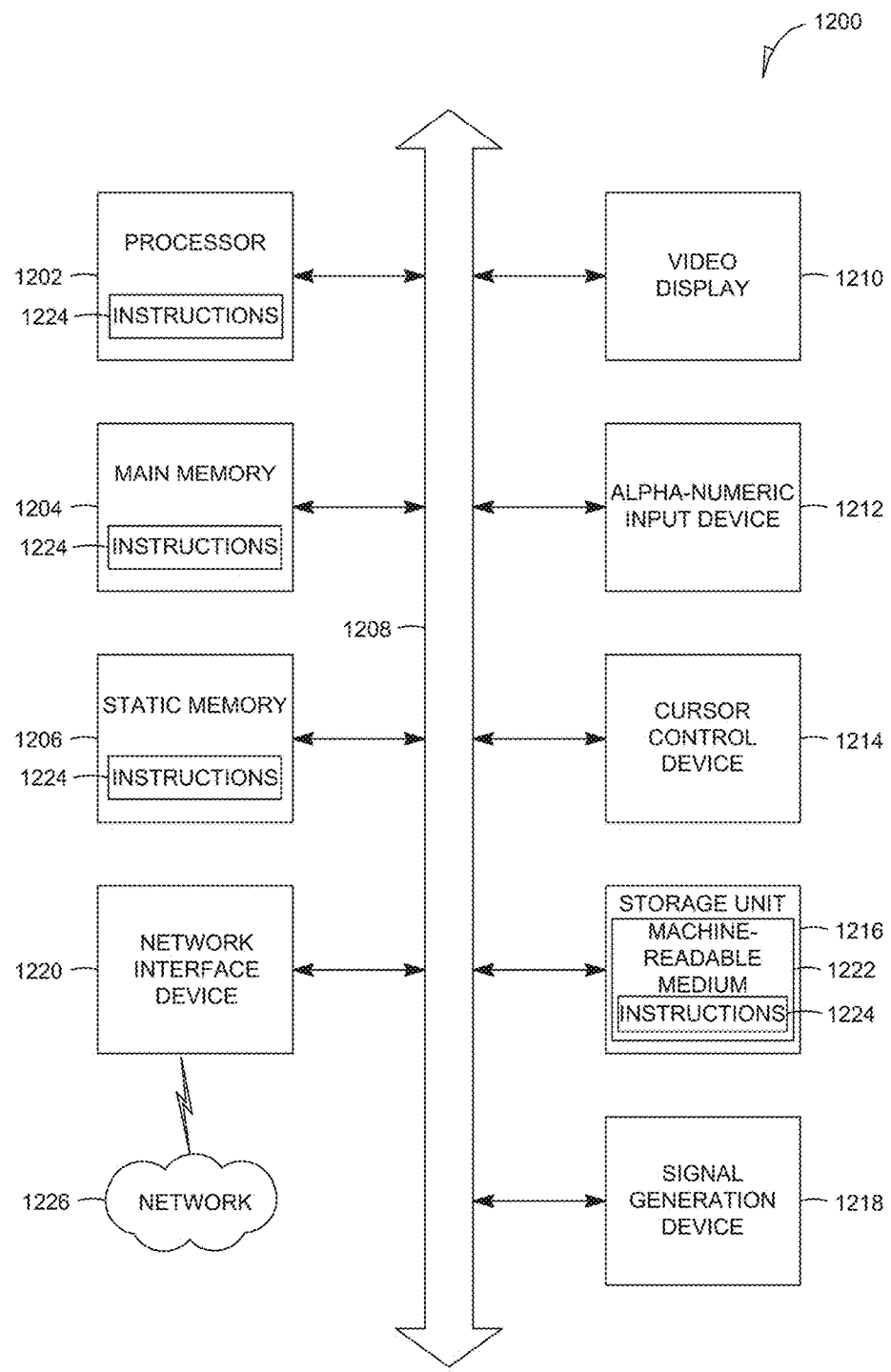
FIG. 8 is a block diagram of a machine in the example form of a computer system within which instructions for causing the machine to perform any one or more of the methodologies discussed herein may be executed.

FIG. 8 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    receiving, from a user device, a selection of a subset of data fields of data stored in one or more user profiles of the social-networking system, each of the user profiles associated with one or more additional user devices, at least one of the subset of the data fields pertaining to connection information included in the user profiles;
    defining one or more graphical elements by mapping the selection of the subset of data fields to the one or more graphical elements, at least one of the graphical elements representing a level of relatedness between the user of the user device and a user of at least one of the one or more additional user devices, the level of relatedness derived from the connection information;
    determining a location of the user device;
    identifying a group of the one or more additional user devices;
    determining a location of each of the additional user devices of the group;
    comparing, using one or more processors, information stored in a profile associated with the user device with information stored in one or more user profiles associated with the group, the information pertaining to the level of relatedness;
    selecting, using one or more processors, a subset of the group based on the location of the user device, the locations associated with the group and the comparing of the information; and
    transmitting, from a server over a network, instructions to cause the user device to generate a user interface that is configured to display the at least one of the graphical elements in a condensed visual form particularly suited for a small screen space of the user device such that a user of the user device can ascertain the level of relatedness between the user of the user device and a user of the additional user devices of the selected subset of the group.

2. The method of claim 1, further comprising receiving from the user device a selection of displayed graphical element.

3. The method of claim 1, further comprising determining a range of the user device and the selecting of the subset being based on a subset of the group of additional user devices falling within the range of the user device.

4. The method of claim 3, wherein the determining of the range of the user device is based on an orientation of the user device and the locations associated with the group.

5. The method of claim 1, further comprising determining a field of vision of the user device and the instructions further instructing the user interface to display information about the geographical location of each of the additional users who are not within the field of vision.

6. The method of claim 1, further comprising:
    defining information regions to be displayed on the user interface, the information regions including at least one graphical element representing values of selected data fields maintained in the profiles associated with the additional user devices; and
    visually associating each of the information regions with each of the additional user devices respectively.

7. The method of claim 1, wherein the level of relatedness includes a degree of connection between the user of the user device and a user of at least one of the one or more additional user devices.

8. The method of claim 7, wherein the at least one of the graphical elements includes embedded circles representing the degree of the connection.

9. A system comprising:
    a computer-readable hardware storage device having instructions stored there on, which, when executed by the computer, cause the computer to perform operations comprising:
    receiving, from a user device, a selection of a subset of data fields of data stored in one or more user profiles of the social-networking system, each of the user profiles associated with one or more additional user devices, at least one of the subset of the data fields pertaining to connection information included in the user profiles;

defining one or more graphical elements by mapping the selection of the subset of data fields to the one or more graphical elements, at least one of the graphical elements representing a level of relatedness between the user of the user device and a user of at least one of the one or more additional user devices, the level of relatedness derived from the connection information;

determining a location of the user device;

identifying a group of the one or more additional user devices;

determining a location of each of the additional user devices of the group;

comparing; using one or more processors, information stored in a profile associated with the user device with information stored in one or more user profiles associated with the group, the information pertaining to the level of relatedness;

selecting, using one or more processors, a subset of the group based on the location of the user device, the locations associated with the group and the comparing of the information; and transmitting, from a server over a network, instructions to cause the user device to generate a user interface that is configured to display the at least one of the graphical elements in a condensed visual form particularly suited for a small screen space of the user device such that a user of the user device can ascertain the level of relatedness between the user of the user device and a user of the additional user devices of the selected subset of the group.

10. The system of claim 8, further comprising receiving from the user device a selection of displayed graphical element.

11. The system of claim 9, further comprising determining a range of the user device and the selecting of the subset being based on a subset of the group of additional user devices falling within the range of the user device.

12. The system of claim 11, wherein the determining of the range of the user device is based on an orientation of the user device and the locations associated with the group.

13. The system of claim 9, further comprising determining a field of vision of the user device and the instructions further instructing the user interface to display information about the geographical location of each of the additional users who are not within the field of vision.

14. The system of claim 9, further comprising:
defining information regions to be displayed on the user interface, the information regions including at least one graphical element representing values of selected data fields maintained in the profiles associated with the additional user devices; and visually associating each of the information regions with each of the additional user devices respectively.

15. A computer-readable hardware storage device having stored therein a set of program instructions which, when executed by the computer, causes the computer to perform operations, the operations comprising:

receiving, from a user device, a selection of a subset of data fields of data stored in one or more user profiles of the social-networking system, each of the user profiles associated with one or more additional user devices, at least one of the subset of the data fields pertaining to connection information included in the user profiles;

defining one or more graphical elements by mapping the selection of the subset of data fields to the one or more graphical elements, at least one of the graphical elements representing a level of relatedness between the user of the user device and a user of at least one of the one or more additional user devices, the level of relatedness derived from the connection information;

determining a location of the user device;

identifying a group of the one or more additional user devices;

determining a location of each of the additional user devices of the group;

comparing, using one or more processors, information stored in a profile associated with the user device with information stored in one or more user profiles associated with the group, the information pertaining to the level of relatedness;

selecting, using one or more processors, a subset of the group based on the location of the user device, the locations associated with the group and the comparing of the information; and transmitting, from a server over a network, instructions to cause the user device to generate a user interface that is configured to display the at least one of the graphical elements in a condensed visual form particularly suited for a small screen space of the user device such that a user of the user device can ascertain the level of relatedness between the user of the user device and a user of the additional user devices of the selected subset of the group.

16. The computer-readable hardware storage device of claim 15, further comprising receiving from the user device a selection of a displayed graphical element.

17. The computer-readable hardware storage device of claim 15, further comprising determining a range of the user device and the selecting of the subset being based on a subset of the group of additional user devices falling within the range of the user device.

18. The computer-readable hardware storage device of claim 17, wherein the determining of the range of the user device is based on an orientation of the user device and the locations associated with the group.

19. The computer-readable hardware storage device of claim 15, further comprising determining a field of vision of the user device and the instructions further instructing the user interface to display information about the geographical location of each of the additional users who are not within the field of vision.

* * * * *

UNITED STATES PATENT AND TRADEMARK OFFICE
CERTIFICATE OF CORRECTION

PATENT NO. : 10,110,542 B2
APPLICATION NO. : 14/145682
DATED : October 23, 2018
INVENTOR(S) : Cohen et al.

Page 1 of 1

It is certified that error appears in the above-identified patent and that said Letters Patent is hereby corrected as shown below:

In the Claims

In Column 15, Line 13, in Claim 9, delete "comparing;" and insert --comparing,-- therefor In Column 15, Line 31, in Claim 10, delete "claim 8," and insert --claim 9,-- therefor Signed and Sealed this
Eleventh Day of June, 2019

Andrei Iancu
*Director of the United States Patent and Trademark Office*